United States Patent [19]

Meyer

[11] Patent Number: 6,017,572
[45] Date of Patent: Jan. 25, 2000

[54] ULTRA HIGH PRESSURE, HIGH TEMPERATURE FOOD PRESERVATION PROCESS

[76] Inventor: Richard S. Meyer, 3813 E. 80th St., Tacoma, Wash. 98443

[21] Appl. No.: 09/203,977

[22] Filed: Dec. 2, 1998

Related U.S. Application Data

[60] Provisional application No. 60/100,680, Sep. 17, 1998.
[51] Int. Cl.$^7$ ........................................ A23L 3/00
[52] U.S. Cl. ............................. 426/521; 426/665
[58] Field of Search .................... 426/521, 522, 426/665; 422/33, 295; 99/461

[56] References Cited

U.S. PATENT DOCUMENTS

| | | | |
|---|---|---|---|
| 5,232,726 | 8/1993 | Clark et al. | 426/519 |
| 5,316,745 | 5/1994 | Ting et al. | 422/295 |
| 5,439,703 | 8/1995 | Kanda et al. | 426/521 |
| 5,593,714 | 1/1997 | Hirsch | 426/410 |

FOREIGN PATENT DOCUMENTS

| | | |
|---|---|---|
| 0 429 966 A2 | 6/1991 | European Pat. Off. . |
| 63-169947 | 7/1988 | Japan . |
| 03290174 | 12/1991 | Japan . |
| 05007479 | 1/1993 | Japan . |
| 05076328 | 3/1993 | Japan . |
| WO 95/08275 | 3/1995 | WIPO . |
| WO 97/21361 | 6/1997 | WIPO . |

OTHER PUBLICATIONS

Seyderhelm, I. and Knorr, D., "Reduction of *Bacillus stearothermophilus* Spores by Combined High Pressure and Temperature Treatments," *European Food Science* (1992) vol. 43, pp. 17–20.

Rovere, P., Carpi, G., Maggi, A., Gola, S., and Dall'Aglio, G., "Stabilization of Apricot Puree by Means of High Pressure Treatments," *Prehrambeno–technol. Biotechnol. Rev.* (1994), vol. 32, pp. 145–150.

Oakley, R., "Alternate technologies to heat treatment to achieve food sterilisation and pasteurisation are discussed from a microbiological standpoint," *Food Review* (1997), pp. 21–23.

G.D. Aleman et al., "Pulsed Ultra High Pressure Treatments for Pasteerization of Pineapple Juice," *Journal of Food Science*, 61:388–390 (1996).

G.D. Aleman et al., "Comparison of Static and Step–Pulsed Ultra–High Pressure on the Microbial Stability of Fresh cut Pineapple," *Journal of the Science of Food and Agriculture*, 76:383–388 (1998).

"Ultrahigh–Pressure Isolator for In–line Food Processing," Information Sheet, Flow International Corporation (1997).

T. Okazaki et al., "Possibility of the Combination Treatment of Pressurization and Heating for the Purpose of Food Sterilization," Abstract No. E7, The Sixth Symposium by Japanese Research Group of High Pressure Bioscience (Aug. 19–20, 1993).

C.E. Morris, "High–Pressure Builds Up," *Food Engineering*, (Oct. 1993).

U.R. Pothakamury et al., "The Pressure Builds for Better Food Processing," *Chemical Engineering Progress*, (Mar. 1995).

M. Karel et al., "Part II, Physical Principles of Food Preservation," *Principles of Food Science*, 4:37–53 (1975).

D.L. Downing, Ph.D., "Book II, Microbiology, Packaging, HACCP & Ingredients," *A Complete Course in Canning and Related Processes*, (1996).

J. Antonio Torres et al., "Pressure Pulsing; Improving UHP Effectiveness" (Date prior to Dec. 2, 1998).

C.G. Mailldis et al., "Effect of simultaneous application of heat and pressure on the survival of bacterial spores," *Journal of Applied Bacteriology*, 71:285–288 (1991).

A.B. Boveri, U.S. 5,658,610 abstract.

*Primary Examiner*—George C. Yeung
*Attorney, Agent, or Firm*—Christensen O'Connor Johnson & Kindness PLLC

[57] ABSTRACT

This invention pertains to methods for achieving the commercial sterilization of foods having a pH greater than or equal to 4.5 involving concomitant treatment of the food to two or more cycles of high heat, high pressure, with a brief pause between cycles. The pressurization schedule relies on-the additional instantaneous, uniform heat from adiabatic pressurization and then instantaneous, uniform adiabatic cooling during depressurization for each cycle.

21 Claims, No Drawings

ULTRA HIGH PRESSURE, HIGH TEMPERATURE FOOD PRESERVATION PROCESS

CROSS-REFERENCE TO RELATED APPLICATION

This application claims the benefit of the filing date of U.S. provisional patent application Ser. No. 60/100,680 filed Sep. 17, 1998.

FIELD OF THE INVENTION

This invention pertains to methods for achieving the commercial sterilization of foods having a pH greater than or equal to 4.5 involving concomitant treatment of the food with heat and high pressure. At least two cycles of pressurization, with a pause between cycles, are utilized. The preheated foods are subjected each cycle to additional instantaneous, uniform heat from adiabatic heating upon pressurization and then instantaneous, uniform adiabatic cooling upon depressurization.

BACKGROUND OF THE INVENTION

The conventional approach to commercial sterilization of food is thermal processing using slow heating retorts with slow cooling in cans afterwards. This process is highly effective for inactivating microorganisms, enzymes and microbial spores that cause food spoilage in shelf stable foods. However, due to the lengthy thermal process caused by slow heat penetration to the can's center and subsequent slow cooling, the prolonged thermal process significantly softens texture in vegetables and meat and induces an undesirable change in flavors. Pasta and rice lose their chewiness and become mushy; meat also loses its chewiness and becomes soft in texture; vegetables also lose their crunchiness and become soft. The color in dairy products takes on a scorched, brown color while vegetables fade in color. Delicate products such as those containing cheese and dairy products such as macaroni and cheese can not be made using conventional retorting because they caramelize, take on a very undesirable flavor and become inedible. Even faster heating systems such as aseptic heating suffers from a prolonged heating up time and holding period (to achieve commercial sterility) which causes scorched, undesirable flavors along with a prolonged cooling period.

A recently developed alternative to conventional thermal processing is the use of ultra-high pressure to destroy spoilage-causing microorganisms and spoilage-related endogenous enzymes. The use of ultra-high pressure for food processing has been made possible by recent advances in the engineering of devices capable of delivering the necessary pressures to commercially useful amounts of foods. Machinery capable of industrial high pressure food sterilization is available, for example, from Flow International Corp. (Kent, Wash.), Mitsubishi Heavy Industries (Tokyo, Japan), Kobe Steel (Kobe, Japan), ABB Autoclave Systems, Inc. (Vasteras, Sweden), and Engineered Pressure Systems, Inc. (Andover, Mass.).

It has been suggested that low acid foods can be sterilized using a combination of ultra-high pressure and high temperatures. International PCT Application No. W097/21361 discloses a process for heating low acid canned foods to a temperature of 80–99° C., then pressurizing them to a pressure of 50,000–150,000 psi, followed by decompression and transfer to a cooling trough. The process takes advantage of the adiabatic temperature rise induced in the food upon pressurization, of approximately 20° C. at a pressurization of 100,000 psi, and the corresponding adiabatic temperature decrease upon depressurization, to reduce preheating and post-chilling times. However, the process disclosed in this reference in fact does not achieve sterility at commercially useful pressurization times. For example, a disclosed pressurization cycle of 90,000 psi at 85° C. for 30 minutes provides an insufficient lethality, i.e., was insufficient to obtain a reduction of 1012 in the population of botulism spores (a 12D reduction). An alternate pressure sequence disclosed in this reference is 90,000 psi at 98° C. for five minutes. This provides a lethality that computes to be in excess of the standard 12D requirement, yet has been found by the present inventor to result in an insufficient sterilization of *B. cereus*, which tend to multiply to unacceptable levels within one week of pressurization. The only sequence disclosed that would achieve true sterility in this reference is 90,000 psi at 98° C. for 30 minutes, which is too long to be of commercial utility, and which would result in a highly overcooked food product.

Other researchers have suggested that exposing foods to pulses of ultra-high pressurize effective at reducing microbes for increased refrigerated microbial stability. Torres, J. A. and Aleman, G., *Pressure Pulsing: Improving UHP Effectiveness*, OSU Food Process Engineering and Flow International Corp. However, these researchers have not suggested the use of ultra-high pressure pulsing to achieve commercial sterility.

Still other researchers have found that a combination of heat and ultra-high pressurization is not effective at achieving commercial sterility, due to the survival of bacterial spores. Mallidis, C. G. and Drizou, D., *Effective Simultaneous Application of Heat and Pressure on the Survival of Bacterial Spores*, Journal of Applied Bacteriology, 71, p. 285–88 (1991). This reference teaches that spores are extremely heterogeneous in their sensitivity to heat and pressure, and concludes that a combination of pressure and heat is not effective for the preservation of liquid foods.

There thus has not yet been developed a commercially viable method of commercially sterilizing low acid foods while preserving the flavor and texture benefits of short-exposure to ultra-high pressurization.

SUMMARY OF THE INVENTION

The present invention provides a method that combines two or more cycles of ultra-high pressure, high initial temperatures and instantaneous, uniform adiabatic heating (which naturally occurs under high pressure) and adiabatic temperature reduction (upon release of pressure), with a pause between each cycle, to achieve commercial sterilization of foods. This is accomplished without adversely affecting the delicate flavors in foods and with minimal changes in texture and color. This method is particularly advantageous for foods having a pH greater than or equal to 4.5, because all *Clostridium botulinum* spores of all strains are completely eliminated. Surprisingly, there appears to be a synergistic affect between high pressure and heat which more than doubles the effect of the heat (kills more than twice the spores as compared to the same heat alone). The cycling of adiabatic pressurization of the hot food, with a short pause between cycles, eliminates spores that survive the initial pressurization.

Thus, a preferred embodiment of the present invention entails the steps of: (1) preheating a food to a predetermined initial temperature; (2) subjecting the preheated food to a first elevated pressure (i.e., ultra-high pressure) for a first predetermined pressurization time, with co-commitant adiabatic temperature increase; (3) releasing the elevated pressure to return the food to a lower pressure, preferably ambient pressure, with co-commitant temperature decrease to approximately the initial temperature; (4) exposing the food to a second predetermined elevated pressure for a second predetermined period of time; and then (5) releasing the pressure and cooling the food to result in a commercially sterile food product. The initial preheat temperature, ultra-high pressurization levels, pressurization time periods, and the time period between cycles, are all selected to yield a commercially sterile product, and in particular, a product which has been sterilized of *C. botulinum* and *B. Cereus* spores, while substantially preserving the flavor and texture characteristics of the pre-sterilized food.

While first and second pressurization cycles are sufficient for sterilization in accordance with the process of the present invention, and additional cycles are not believed to be necessary or particularly advantageous, the present invention is to be understood to also encompass more than two cycles of pressurization, so long as the overall schedule of the temperature and pressurization results in a commercially sterile product having good flavor and texture characteristics.

In between the first and second cycles, a brief pause ranging from instantaneous to 5 minutes or longer, and preferably, from at least one second to less than 5 minutes, and still more preferably at least 5 seconds to 1 minute, is utilized. In the examples set forth herein below, the same ultra-high pressurization level, i.e., maximum elevated pressure, is utilized for both the first and second cycles. However, it should be readily apparent to those skilled in the art based on the disclosure herein that differing pressures may be utilized for the first and second cycles, so long as commercial sterility is achieved, while preserving flavor and texture. Further, in the example set forth below, the time period of pressurization in the first and second cycles is varied, with the first pressurization cycle typically having a longer predetermined period of time then the second pressurization cycle. However, it should also be understood that the present invention encompasses pressurization for equal periods of time in the first and second cycles, or pressurization for a longer period of time in the second cycle than in the first cycle.

In one aspect of this invention, the foods to be sterilized are pre-heated, preferably to temperatures above 70° C. (158° F.), more preferably to at least 85° C. and still more preferably to 90° C. (194° F.) to 100° C. (212° F.) or higher. The first and second (or more) pressurization cycles are preferably from about less than a second to 200 minutes, and entail exposure to maximum pressures of about 50,000 to 140,000 psi or greater, more preferably 60,000 psi to 120,000 psi. Pressurization of the preheated food preferably occurs in a pressure chamber that itself has been pre-heated to the same or greater temperature as that of the pre-heated food (preferably at the same maximum temperature to which the food is exposed, i.e., of the combined initial temperature plus the adiabatic heating temperature increase). This combination of initial temperature and adiabatic heating cycles is set to be sufficient to eliminate *Clostridium botulinum* with a safety factor twice that recommended by the U.S. Food and Drug Administration. The FDA standard is referred to as an "Fo of 6.0 process," or the food being subjected to an equivalent heat process of six minutes at 250° F. This two-fold safety factor standard is also known as the two 12 D process or 2 bot kill process, which is twice the minimum process for canning non-acid foods as recommended by FDA. *A Complete Course in Canning*, p. 46, 48 (1996).

Table 1 provides a table of the adiabatic heat increase which occurs upon pressurization.

TABLE 1

Predicted Relationships Between Heat and Pressure:

| Base Temperature C. | Adiabatic Heat C. | Final Temperature C. | Time for an Fo of 6.0* |
|---|---|---|---|
| | at 60,000 psi | | |
| 71.1 | | | |
| 76.7 | | | |
| 82.2 | 20.3 | | |
| 87.8 | 21.7 | 109.5 (229.1 F.) | 87 minutes |
| 90.0 | 22.25 | 112.25 (234.05) | 56 minutes |
| 90.55 | 22.388 | 112.938 (235.28 F.) | 39 min. 35 sec. |
| 93.3 | 23.075 | 116.375 (241.475 F.) | 17 min. 52 sec. |
| 98.9 | 24.475 | 123.375 (254.075 F.) | 3 min. 34 sec. |
| | at 80,000 psi | | |
| 71.1 | | | |
| 76.7 | | | |
| 82.2 | 23.85 | 106.05 (222.89 F.) | 193 minutes |
| 87.8 | 25.25 | 113.05 (235.45 F.) | 38 min. 36 sec. |
| 90.0 | 25.80 | 115.8 (240.44 F.) | 20 min. 23 sec. |
| 90.55 | 25.938 | 116.488 (241.68 F.) | 17 min. 21 sec. |
| 93.3 | 26.625 | 119.925 (247.865 F.) | 7 min. 53 sec. |
| 98.9 | 28.025 | 126.925 (260.465 F.) | 1 min. 35 sec. |
| | at 100,000 psi | | |
| 71.1 | | | |
| 76.7 | | | |
| 82.2 | 27.25 | 109.48 (229.01 F.) | 88 minutes |
| 87.8 | 28.65 | 116.45 (241.61 F.) | 17 min. 33 sec. |
| 90.0 | 29.20 | 119.2 (246.56 F.) | 9 min. 19 sec. |
| 90.55 | 29.338 | 119.89 (247.80 F.) | 7 min. 57 sec. |
| 93.3 | 30.025 | 123.325 (253.985 F.) | 3 min. 37 sec. |
| 98.9 | 31.425 | 130.325 (266.58 F.) | 44 seconds |
| | at 120,000 psi | | |
| 71.1 | 27.775 | 98.875 (209.975 F.) | |
| 76.7 | 29.725 | 106.425 (223.5 F.) | |
| 82.2 | 30.55 | 112.75 (234.95 F.) | 41 min. 8 sec. |
| 87.8 | 31.95 | 119.75 (247.55 F.) | 8 min. 13 sec. |
| 90.55 | 32.64 | 123.19 (253.74 F.) | 3 min. 45 sec. |
| 93.3 | 33.325 | 126.6 (259.9 F.) | 1 min. 41 sec. |
| 98.9 | 34.725 | 133.6 (272.9F) | 19 seconds |

Note: *An Fo of 6 is equal to 250° F. for six minutes, and is regarded by the FDA as sufficient to produce commercially sterile product using thermal processing alone.

As can be observed from this table, the temperature increment that results from adiabatic heating is a function of both the initial temperature of the food and the amount of pressure applied. One aspect of adiabatic heating is that for a given pressure, the adiabatic heat increment increases as the initial pre-pressurization temperature increases.

DETAILED DESCRIPTION OF THE PREFERRED EMBODIMENT

Provided here are methods for achieving the commercial sterilization of foods that combine high temperatures with ultra-high pressures. These methods are especially advantages for foods having a pH of 4.6 or higher which poise a potential problem with *Clostridium botulinum* or *B. Cereus*. A food rendered commercially sterile according to the subject methods has a shelf life of more than two years at room temperature.

The subject methods involve heating a food to an initial temperature above 70° C. (158° F.), preferably to at least 85° C., and still more preferably to 90° C. (194° F.) to 100° C. (212° F.) or higher, before being subjected for a first cycle of about less than a second to 200 minutes, preferably 10 seconds to 10 minutes, most preferably 1 to 5 minutes, at an elevated pressure of 50,000 psi to 140,000 psi or greater, more preferably about 60,000 psi to 120,000 psi in a pressure chamber that itself has been pre-heated to the same or greater temperature as that of the pre-heated food (preferably at the temperature of the combined initial temperature plus the adiabatic heating). This combination of initial temperature and pressure, instantaneously and uniformly-raises the food temperature to the desired temperature for sterilization; the food is held under these conditions for a first predetermined time period. Then, the pressure is released to a low pressure less than the elevated pressure, preferably to ambient pressure, upon which the product is instantly and uniformly cooled back to about the temperature of pre-heating. Following this ambient pressure pause, which can range from instantaneous to five minutes or longer, and preferably from seconds to 1 minute, the food is pressurized for a second cycle of about less than a second to 200 minutes, preferably 10 seconds to 10 minutes, most preferably 1 to 5 minutes, at a pressure of about 50,000 psi to 140,000 psi, more preferably at 60,000 psi to 120,000 psi. Pressure is then again released, and the product is chilled back to ambient temperature. The total duration of the first pressurization cycle, the pause, and the second pressurization cycle, (including approximately 2 minutes for pressurization ramp ups and downs) is suitably less than 30 minutes, preferably less than 5 minutes, and more preferably is less than or equal to 1 minute. The instant "adiabatic heating and cooling" that occurs upon pressurization minimizes the heat exposure to the food (it is the prolonged exposure to heat that causes the damage to the flavor, texture and color), but is sufficient to achieve commercial sterility when pressurization is carried out for at least two cycles, with an ambient pressure pause therebetween. The food may be pre-heated, e.g., in a water bath, before being placed in the pressure vessel, can be preheated in a commercial plate heat exchanger or swept surface heat exchanger, or can be heated in the pressure vessel equipped with its own heater. Pressurization equipment having both heating and cooling capacity for the pressure vessel is available, for example, from ABB Autoclave Systems and from Engineered Pressure Systems.

During each pressurization cycle, the principle of adiabatic heating (and cooling with the release of the pressure) results in an increase (or decrease) of about 60–90° F. (or higher with pressures beyond 120,000 psi) in the temperature of the food, the actual increment being a function of both the initial temperature and the amount of pressure applied. For example, if 60,000 psi is used to pressure food pre-heated to 210° F., the adiabatic heat increase is about 77° F., but if 100,000 psi is used, the increase in temperature is higher, about 88.6° F. Thus, applying ultra high pressure to a preheated food results in an actual sterilization temperature that is about 60–85° F. higher than the temperature to which the food was initially pre-heated. By taking the adiabatic temperature into account, the elevated temperature exposure of the food can be minimized and controlled to within a second. Thus the damaging, prolonged and excessive exposure to elevated and sterilization temperatures can be avoided and the flavor, texture and color can be protected with minimal or no change. The pre-heat temperature and pressure can be selected in accordance with the present invention to reach a time and temperature combination which renders the food product commercially sterile in the minimum total amount of time such as at 210° F. with 100,00 psi at 22 seconds or less.

Prior to the application of high pressure, air is removed from the food sample container and the pressurized vessel. If air were present during processing, compounds that contribute to food flavor might become oxidized, and moreover, because air compresses at high pressures, its presence in the vessel would result in a loss of efficiency. Also the air could react with the plastic packaging material and cause burning like in a diesel engine.

During the pressurization step of each cycle, the pressure applied is optimally between 50,000 psi and 140,000 psi, and preferably is between 60,000 psi and 120,000 psi, and still more preferably is between 80,000 psi and 100,000 psi. The pressure is maintained in each cycle for a period of time sufficient at the end of both cycles to achieve commercial sterility at the temperature being used.

As defined herein, the term "commercial sterility" is used according to its usual meaning, and refers to a food product in which the condition achieved by application of heat which renders such food free of viable forms of microorganisms having public health significance, as well as any microorganism of non-health significance capable of reproducing in the food under normal non-refrigerated conditions of storage and distribution. It is understood that food treated in accord with the subject methods is handled and processed under sanitary conditions, and ordinarily will not contain excessive numbers of contaminating microorganisms. An important aspect of commercial sterility is that live microorganisms in low numbers maybe present in a package of commercially sterile food, but when the food is stored for reasonable lengths of time, the microorganisms will not grow, and the food will remain safe and palatable. Thus, commercially sterile food is defined as one having no pathogenic microorganisms, but may contain such low levels of food spoilage and other microorganisms that fermentation or microbial growth will not occur upon prolonged storage for reasonable lengths of time at normal ambient temperatures, e.g., when stored for 13 to 24 months.

Pressurization for purposes of the subject methods may be achieved using any commercially available devise capable of delivering the requisite high pressures and high temperatures. Prior to pressurization, the food product usually is sealed inside a suitable container such as a plastic bag, can, or other container, or may be pumped through a heat exchanger then into the pressure the pressure vessel in bulk and packaged aseptically in sterile containers after the pressurization step.

The subject methods are particularly useful for preserving foods when delicate flavors and textures are desired. Examples of such foods include macaroni and cheese, vegetables, soups, stews, tender beef and fish, pork, and other meats, dairy products, pasta dishes, rice entrees, potato products, main meal entrees, desserts, non-acidified beverages, chocolate milk, and cottage cheese. Other foods suitable for sterilization using the subject methods include all non-acidified canned goods, all non-acidified frozen products, all non-acidified refrigerated products and all non-acidified beverages; i.e., all foods having a pH equal to or above pH 4.5. While the present invention would also be suitable for sterilization of low pH foods, i.e., foods having a pH less than 4.5, because such low pH foods are less susceptible to spoilage, the high temperature, high pressure schedule that is the subject of the present invention would be overkill.

To readily ascertain the optimal length of the sterilization time period for a selected combination of temperature and pressure, samples can be spiked with the microorganism which has been designated as the substitute test microorganism for *Clostridium botulinum* (Fennema, 1975, part II, p. 36; A Complete Course in Canning, 13th Edition, Book II, p. 44). This microorganism is *Clostridium sporogenes* PA 3679; it is an obligate anaerobe like *Clostridium botulinum*, produces spores like *Clostridium botulinum*, and is easy to assay, and has suitable heat resistance. The shortest time with pressures less that 120,000psi and with the highest temperatures that yields a proper commercially sterile product is optimal, as minimizing the processing time best preserves flavor, texture and color and also speeds up production, while minimizing wear on the equipment.

In another aspect of the invention, the pressure vessel is pre-heated, thus avoids loss of temperature when the pre-heated food is loaded and minimizes or prevents the loss of heat during the pressurized period when the initial food temperature is raised by the adiabatic heat to the target processing temperature.

EXAMPLE I

Single High Temperature, High Pressure Cycle

This experimental design was aimed at taking advantage of the instantaneous, uniform heating and cooling that occurs during the pressurization and de-pressurization steps, which is referred to as adiabatic heating and cooling. Target times and temperatures were calculated using the equations taught in *A Complete Course in Canning*, 13th *Edition, Book II*, pages 62–102. Additional times, temperatures, and pressures were selected which were thought not to give complete sterility and to give greater sterility. Specifically test were initial temperatures of 90° C., 95° C., and 98.9° C., and pressures of 60,000 psi, 80,000 psi and 100,000 psi and various time intervals.

The exemplary foods used in this test were Stouffer's™ frozen macaroni and cheese, thin sliced New York steaks from a supermarket and short grain, polished white rice which was blended with water at the ratio of two parts water to one part rice. The pH of the macaroni and cheese was measured at 5.87, the rice at 7.06 and the meat at 5.97. For this test, 100 grams of each sample product were sealed in a number of individual plastic bags from which the air was evacuated prior to sealing. Using three bags per test variable, the bags were subjected to the conditions described below. Before being pressured, the sealed bags were pre-heated to the test temperature by being placed in a boiling water bath for about five minutes.

Pressurization was accomplished using an ultra high pressure vessel made by Engineered Pressure Systems, Andover, Mass., unit #3 and operated by Washington State University Food Science Pilot Plant management. Ten to twelve sealed bags of product were loaded per run, which filled the pressure vessel. Prior to placing the bags in the pressurization chamber, the chamber walls were preheated to the target temperature by electrical coils surrounding the chamber walls with an inch of fiberglass insulation surrounding the outer wall of the chamber. As the walls of the pressure chamber are several inches thick, the walls once heated, act as an effective heat sink, thus maintained a fairly constant chamber temperature for the times required to process the bags. After loading the pre-heated pressure cell with the pre-heated sealed bags, the cell was filled with a special water/glycol solution pre-heated to the initial test temperature in order to eliminate air from the vessel. The pressure was then raised to either 60,000 psi, 80,000 psi or 100,000 psi depending on the test requirements and at the times dictated by the experimental design. The adiabatic heating and cooling temperature change ranged from 20° C. to 32° C. depending on the initial temperature and ultimate pressure. It is this instantaneous, uniform heating and cooling which is responsible for the absolute minimum exposure of the food to the destructive, high temperatures. As some of the controls, some bags were of food were neither heated nor pressurized. The inoculated samples of macaroni and cheese had *Clostridium sporogenes* spores added at a level of 3.1×100,000 spores per gram of sample and to the beef and rice samples had *Clostridium sporogenes* spores added at a level of 1.4×100,000 spores per gram of sample. After the pressurization process, all sample bags were chilled in ice water and stored frozen until microbiological testing except those which were taste tested against an untreated control. After being allowed to cool, two bags per treatment were opened and tested for flavor and texture. Surprisingly, no changes in flavor, color or texture were observed for any of the samples of macaroni and cheese when compared with the taste of the untreated controls, thus indicating that the very short time at the very high temperatures reached during the pressurization step indeed did not cause any damage or changes in the product. Using conventional thermal processing in a retort causes the macaroni and cheese to become very dark and scorched with a very objectionable flavor. The beef slices were tender with a rich, roasted meaty flavor. The rice tasted like normal, range top cooked rice with the same chewy texture, except that the rice stuck together as one mass.

Two or three days after the processing and again a week later, samples were analyzed as follows for the presence of viable microorganisms and subsequent testing for recovery of injured microorganisms. The microbiological test procedures for this example and those following utilized dilutions prepared in sterile 0.1% peptone water. The dilutions were plated on APC Petrifilm. Where Tactics results are provided in the tables, levels were determined by the pour plate method using MRS agar, incubated anaerobically at 28° C. for 48 hours. Where *Clostridium sporogenes* PA 3679 (Cl. Spore) results are given, vegetative cells were determined by plating dilutions on freshly prepared liver and fusion agar supplemented with 0.3% beef extract and 0.1% yeast extract. Plates were incubated anaerobically at 37° C. for 48 hours. For spores, the 1:10 dilution was heat shocked for 10 minutes at 80° C. in a water bath. Timing began when temperature in a blank tube reached 80° C. Plating and incubation were the same for spores as for the vegetative cells.

The results of these microbiological analyses are shown in Tables 2 and 3, in which microbial growth is indicated by 0 for "no growth" or the actual number counted from the test.

TABLE 2

First Test With Initial Microbiological Testing
(Test on 7/6/98. Initial micro testing.)

| Temperature | Pressure | Times (2 bot. Kill*) | Test Times | Uninoculated | Inoculated |
|---|---|---|---|---|---|
| | | | | Control | |
| 90 C. | 60,000 psi | 56 minutes* | | C | I |
| H | 80,000 psi | 20 min. 23 sec.* | | | |
| | | 1 | 10 min. 10 sec | 0 | 0 |
| | | 2 | 20 min. 23 sec. | 0 | 0 |
| | | 3 | 40 min. 46 sec. | skip | skip |
| G | 100,000 psi | 9 min. 19 sec.* | | | |
| | | 1 | 4 min. 40 sec. | 0 | 0 |
| | | 2 | 9 min. 19 sec. | 0 | 0 |
| | | 3 | 18 min. 40 sec. | 0 | 0 |
| 95 C. | | | | | |
| F | 60,000 psi | 8 min.* | | | |
| | | 1 | 8 min. | 0 | 0 |
| | | 2 | 16 min. | 0 | 0 |
| | | 3 | 4 min. | 0 | 0 |
| E | 80,000 psi | 3 min. 30 sec.* | | | |
| | | 1 | 3 min. 30 sec. | 0 | 0 |
| | | 2 | 7 min. | 0 | 0 |
| | | 3 | 10 min. 30 sec. | 0 | 0 |
| | | 4 | 1 min. 45 sec. | 0 | 0 |
| D | 100,000 psi | 2 min. 14 sec.* | | | |
| | | 1 | 2 min. 14 sec. | 30 | 0 |
| | | 2 | 4 min. 28 sec. | 0 | 0 |
| | | 3 | 6 min. 42 sec. | 0 | 0 |
| | | 4 | 1 min. 7 sec. | 0 | 0 |
| 98.9 C | | | | | |
| C | 60,000 psi | 3 min. 34 sec.* | | | |
| | | 1 | 1 min. 47 sec. | 0 | 0 |
| | | 2 | 3 min. 34 sec. | 0 | 0 |
| | | 3 | 7 min. 10 sec. | 0 | 0 |
| B | 80,000 psi | 1 min. 35 sec.* | | | |
| | | 1 | 50 sec. | 0 | 0 |
| | | 2 | 1 min. 35 sec. | 0 | 0 |
| | | 3 | 3 min. 10 sec. | 0 | 0 |
| A | 100,000 psi | 44 sec.* | | | |
| | | 1 | 22 sec. | 0 | 0 |
| | | 2 | 44 sec. | 2100 | 0 |
| | | 3 | 66 sec. | 0 | 0 |
| | | 4 | 88 sec. | 0 | 0 |
| | | 5 | 180 sec. | 0 | 0 |

Clostridium sporogenes PA 3679; spore level in macaroni and cheese: 3.1 × 100,000
Clostridium sporogenes PA 3679: spore level in beef, rice, and sauce: 1.4 × 100,000
Beef: pH 5.97
Sauce: pH 7.06
Mac and cheese: pH 5.87
*Time at the noted temperature and pressure required for a 2 bot. kill.

TABLE 3

First Test With Microbiological Testing After One-Week Storage
(Second micro testing to measure recovery of injured microbes from HP testing.)

| Temperature | Pressure | Times (2 bot. Kill*) | Test Times | APC | Lactics | Cl. Spor. | Vessel Shell Temperature |
|---|---|---|---|---|---|---|---|
| 90 C | | | | | | | (C) |
| H | 60,000 psi | 56 minutes* | | | | | |
| | 80,000 psi | 20 min. 23 sec.* | | | | | |
| | | 1 | 10 min. 10 sec | 420 | 0 | 0 | 90.1 |
| | | 2 | 20 min. 23 sec. | 60,000 | 60 | 440 | 90.5 |
| G | 100,000 psi | 9 min. 19 sec.* | | | | | |
| | | 1 | 4 min. 40 sec. | 1900 | 0 | 10 | 90.9 |
| | | 2 | 9 min. 19 sec. | 72,000 | 0 | 30 | 91.1 |
| | | 3 | 18 min. 40 sec. | 30 | 0 | 0 | 90.2 |
| 95 C | | | | | | | |
| F | 60,000 psi | 8 min.* | | | | | |
| | | 1 | 8 min. | 1300 | 6840 | 130 | 95.6 |
| | | 2 | 16 min. | 330 | 0 | 0 | 95.5 |
| | | 3 | 4 min. | 1300 | 0 | 0 | 95.7 |
| E | 80,000 psi | 3 min. 30 sec.* | | | | | |
| | | 1 | 3 min. 30 sec. | 36,000 | 9 | 550 | 95 |
| | | 2 | 7 min. | 130,000 | 20 | 1150 | 95.4 |
| | | 3 | 10 min. 30 sec. | 24,000 | 300 | 330 | 97.1 |
| | | 4 | 1 min. 45 sec: | 59,000 | 0 | 130 | 95.1 |
| D | 100,000 psi | 2 min. 14 sec.* | | | | | |
| | | 1 | 2 min. 14 sec. | 20,000 | 0 | 40 | 95 |
| | | 2 | 4 min. 28 sec. | 40,000 | 60 | 7200 | 95.3 |
| | | 3 | 6 min. 42 sec. | 51,000 | 0 | 50 | 95 |
| | | 4 | 1 min. 7 sec. | 40,000 | 940 | 7980 | 95 |
| 98.9 C | | | | | | | |
| C | 60,000 psi | 3 min. 34 sec.* | | | | | |
| | | 1 | 1 min. 47 sec. | 30 | 0 | 0 | 98.9 |
| | | 2 | 3 min. 34 sec. | 21,000 | 0 | 40 | 98.9 |
| | | 3 | 7 min. 10 sec. | 73,600 | 0 | 14,250 | 98.9 |
| B | 80,000 psi | 1 min. 35 sec.* | | | | | |
| | | 1 | 50 sec. | 21,000 | 0 | 10 | 98.6 |
| | | 2 | 1 min. 35 sec. | 2400 | 0 | 0 | 99.1 |
| | | 3 | 3 min. 10 sec. | 8900 | 560 | 5700 | 98.5 |
| A | 100,000 psi | 44 sec.* | | | | | |
| | | 1 | 22 sec. | 1300 | 0 | 10 | 98.9 |
| | | 2 | 44 sec. | 2100 | 70 | 10 | 98.9 |
| | | 3 | 66 sec. | 30 | 0 | 0 | 98.9 |
| | | 4 | 88 sec. | 1300 | 0 | 0 | 98.9 |
| | | 5 | 180 sec. | 640 | 0 | 0 | 98.5 |

**Compared to original frozen macaroni and cheese
Clostridium sporogenes PA 3679; spore level in macaroni and cheese: 3.1 × 100,000
Clostridium sporogenes PA 3679: spore level in beef, rice, and sauce: 1.4 × 100,000
Beef: pH 5.97
Mac and cheese: pH 5.87

Table 2 illustrates that in all the samples the microbes present were either killed or injured to the point that they could not immediately grow. However, after one week of storage, Table 3 demonstrates that the many Bacillus cereus spores were only injured and survived the process. The APC counts in Table 3 are from *Bacillus cereus*. Table 3 also indicates that the higher temperatures effectively killed the *Clostridium sporogenes* (PA3679) spores. Surprisingly, the longest times should have killed all the spores several times over according to conventional thermal processing technology. This means that high pressure causes the spores, especially *Bacillus cereus* spores, to become more resistant to the high heat.

EXAMPLE II

High Temperature, High Pressure Cycles With Pause

TABLE 4

Test Design to Eliminate Microbes and Spores Using Heat,
Pressure and Additives With a Pause in the Process

| Temperature | Pressure | Times (2 bot. Kill*) | | Test Times Full Pressure 130 C.+ | Hold Time No Pressure 100 C. | Test Time Full Pressure 130 C.+ | Vessel Shell Temperature (C) |
|---|---|---|---|---|---|---|---|
| 90 C. | 100,000 psi | 9 min. 19 sec* | 1 | 4 min. 40 sec. | 5 minutes | 4 min. 40 sec. | 95 |
| | | J | 2 | 9 min. 19 sec. | 5 minutes | 4 min 40 sec. | 90 |
| | | | 3 | 18 min. 40 sec. | 5 minutes | 4 min. 40 sec, | 91 |
| | | | 4 | | | | 90 |
| Preheat samples 5 min at 100 C. | | K | 1 | 4 min. 40 sec. | 5 minutes | 4 min. 40 sec. | 90 |
| | | | | | | | 95 |

In the second test as outlined in Table 4, one set of samples of macaroni and cheese had no additives added while a second set had Sodium benzoate (0.1%) and Nisin (0.02%) added.

In the second high-pressure test, the lowest temperature (90° C.) was used. A pause period of five minutes between pressure cycles was utilized, during which the pressure was released, but the initial temperature was maintained (90° C.). This pause was selected based on the theory that it would activate the remaining spores (cause the spore to germinate or convert to a normal, fragile cell structure) to make them more vulnerable to the second pressure and heat step. It could also serve to disrupt the spore's tough, protective cell wall with the release of pressure and the re-application of pressure which would make the spore more vulnerable to heat. However, the invention is not intended to be limited by this theory.

As the results reflect in Tables 5 and 6, a schedule of pressure with heat, then no pressure with heat, then pressure with heat did provided complete sterilization. Three samples from each treatment were tested microbiologically which accounts for the multiple values reported in Tables 5 and 6. Microbiological counts of 30 or less would also be considered sterile since these low numbers were found not to grow. It appears that preservatives have little effect in this series of treatments; however, with more minimal processes, preservatives are expected to help prevent microbial growth. It is preferred that the shell temperature is kept at 90° C. or higher to lessen the cooling effect when the adiabatic heat is achieved at the full pressure (100,000 psi). Some cooling is expected, but is undesirable. This cooling can be minimized by insulating the inside portion of the pressure vessel shell.

It is expected that if a complete sterilization was achieved at the lower temperature (90° C.), then the higher temperatures (95° C. and 98.9° C.) would work even better with a double process with pause between the first process and a repeat of the first process. For example, in the first test using 100,000 psi at 98.9° C. for 22 seconds, then a 5-minute pause or even 5 second pause with no pressure followed by another 22 seconds at 100,000 psi is expected to work since it is a much harsher treatment than the 90° C. treatment that did work (and the shell temperature was cooler too). In all of the pressure cycles disclosed above, time at pressure in the first and second cycles refers to time at maximum pressure, and does not include time for raising pressure (approximately 90 seconds) or for releasing pressure (approximately 10 seconds). It is expected that all the processes in the first experiment would produce a sterile product if the process was repeated after a pause with no pressure, because those processes are all much harsher than double processes tested in the second test which produced sterile products.

Table 7 indicates the microbial populations prior to high pressure treatments in the second test. The macaroni and cheese was packaged in plastic in the same manner as described in the first test and was again from unprocessed Stouffer's™ frozen macaroni and cheese. The flavor of the processed product was tested in a paired comparison test with the Stouffer's frozen macaroni and cheese product and no differences in flavor, texture or color were detected.

TABLE 5

Results From Second Test With Additives

| Temperature | Pressure | Times (2 bot. Kill*) | | APC | Lactics | Flavor, Color, Texture |
|---|---|---|---|---|---|---|
| 90 C. | 100,000 psi | 9 min. 19 sec* | 1 | 0, 20, 20 | 0, 0, 30 | No change |
| | | J | 2 | 0, 0, 20 | 0, 0, 0 | No change |
| | | | 3 | 0, 0, 10 | 0, 0, 0 | No change |
| | | | 4 | 0, 20 | 0, 0 | No change |
| Preheat samples 5 min at 100 C. | | K | 1 | 0, 30 | 0, 0 | No change |

TABLE 6

Results From Second Test With No Additives

| Temperature | Pressure | Times (2 bot. Kill*) | | APC | Lactics | Flavor, Color, Texture |
|---|---|---|---|---|---|---|
| 90 C. | 100,000 psi | 9 min. 19 sec* | 1 | 0, 0, 0, 0 | 0, 0, 0, 0 | No change |
| | | J | 2 | 0, 0, 10 | 0, 0, 0 | No change |
| | | | 3 | 0, 0, 0 | 0, 0, 0 | No change |
| | | | 4 | 0, 0, 20 | 0, 0, 0 | No change |
| Preheat samples 5 min at 100 C. | | K | 1 | 0, 0, 30 | 0, 0, 0 | No change |

TABLE 7

Initial and One-Week Microbiological Counts in Non-treated Controls

| | | Initial Microbiological Counts | | | |
|---|---|---|---|---|---|
| Sample | Additives | Initial APC | Initial Lactics | 1 week APC | 1 week Lactics |
| 1 | yes | 1,200 | 24,000 | 970,000 | 1,000,000+ |
| 2 | yes | 1,800 | 37,000 | 1,850,000 | 1,000,000+ |
| 3 | yes | 1,400 | 19,000 | 870,000 | 1,000,000+ |
| 4 | yes | 1,400 | 21,000 | 1,100,000 | 1,000,000+ |
| 5 | no | 15,000 | 38,000 | 950,000 | 1,000,000+ |
| 6 | no | 21,000 | 69,000 | 1,800,000 | 1,000,000+ |
| 7 | no | 800 | 29,000 | 760,000 | 1,000,000+ |
| 8 | no | 2,400 | 56,000 | 1,900,000 | 1,000,000+ |

EXAMPLE III

High Temperature, High Pressure Cycles With Varying Pause

To further determine the suitable parameters of temperature and pressure cycling and the duration of pause between cycles, additional tests were carried out on lots of macaroni and cheese, each lot including four samples, utilizing the same procedure set for in Example 2 above. Initial test values for inoculated macaroni and cheese samples that had been subjected to various heat and pressure cycles, as compared to an untreated control, as set forth in Table 8. Microbiological counts were then repeated on additional samples from each of these test lots after one week of storage, as set forth in Table 9.

TABLE 8

Initial Microbiological Counts

| Lot/Sample | | Pressure/Temp./Time Sequence for All Samples in Lot | APC | Yeast | Molds | Lactics |
|---|---|---|---|---|---|---|
| A | 1 | 100,000 psi*/90°/9 min. 19 sec | <10 | <10 | <10 | <10 |
| | 2 | Ambient/90°/5 minutes | <10 | <10 | <10 | <10 |
| | 3 | 100,000 psi/90°/4 min. 40 sec | <10 | <10 | <10 | <10 |
| | 4 | | <10 | <10 | <10 | <10 |
| B | 1 | 100,000 psi**/90°/18 min. 40 sec | <10 | <10 | <10 | <10 |
| | 2 | Ambient/90°/5 minutes | <10 | <10 | <10 | <10 |
| | 3 | 100,000 psi/90°/4 min. 40 sec | <10 | <10 | <10 | <10 |
| | 4 | | <10 | <10 | <10 | <10 |
| C | 1 | 100,000 psi*/90°/9 min. 19 sec | <10 | <10 | <10 | <10 |
| | 2 | Ambient/90°/1 min. | <10 | <10 | <10 | <10 |
| | 3 | 100,000 psi/90°/4 min. 40 sec | <10 | <10 | <10 | <10 |
| | 4 | | <10 | <10 | <10 | <10 |
| D | 1 | 100,000 psi*/90°/9 min. 19 sec | <10 | <10 | <10 | <10 |
| | 2 | Ambient/90°/5 sec. | 10 | <10 | <10 | <10 |
| | 3 | 100,000 psi/90°/4 min. 40 sec | <10 | <10 | <10 | <10 |
| | 4 | | <10 | <10 | <10 | <10 |
| E | 1 | 100,000 psi*/90°/1 min. | <10 | <10 | <10 | <10 |
| | 2 | Ambient/90°/1 min. | <10 | <10 | <10 | <10 |
| | 3 | 100,000 psi/90°/1 min. | <10 | <10 | <10 | <10 |
| | 4 | | <10 | <10 | <10 | <10 |
| F | 1 | 100,000 psi*/90°/4 min. | <10 | <10 | <10 | <10 |
| | 2 | Ambient/90°/5 min. | <10 | <10 | <10 | <10 |
| | 3 | 100,000 psi/90°/1 min. | <10 | <10 | <10 | <10 |
| | 4 | | <10 | <10 | <10 | <10 |
| Control-Untreated | 1 | — | 4,700 | 20 | <10 | 23,200 |

TABLE 8-continued

Initial Microbiological Counts

| Lot/Sample | Pressure/Temp./Time Sequence for All Samples in Lot | APC | Yeast | Molds | Lactics |
|---|---|---|---|---|---|
| 2 | — | 6,700 | 30 | 10 | 19,800 |
| 3 | — | 5,900 | 30 | <10 | 28,000 |
| 4 | — | 2,300 | 10 | <10 | 24,000 |

*1.5 $F_o$, **2.5 $F_o$

TABLE 9

Microbiological Counts After One Week

| Lot/Sample | | Pressure/Temp./Time Sequence for All Samples in Lot | APC | Yeast | Molds | Lactics |
|---|---|---|---|---|---|---|
| A | 1 | 100,000 psi*/90°/9 min. 19 sec | 10 | <10 | <10 | <10 |
|   | 2 | Ambient/90°/5 min. | <10 | <10 | <10 | <10 |
|   | 3 | 100,000 psi/90°/4 min. 40 sec | <10 | <10 | <10 | <10 |
|   | 4 |  | 10 | <10 | <10 | <10 |
| B | 1 | 100, 000 psi**/90°/18 min. 40 sec | <10 | <10 | <10 | <10 |
|   | 2 | Ambient/90°/5 min | <10 | <10 | <10 | <10 |
|   | 3 | 100,000 psi/90°/4 min. 40 sec | <10 | <10 | <10 | <10 |
|   | 4 |  | <10 | <10 | <10 | <10 |
| C | 1 | 100,000 psi*/90°/9 min. 19 sec | <10 | <10 | <10 | <10 |
|   | 2 | Ambient/90°/1 min. | <10 | <10 | <10 | <10 |
|   | 3 | 100,000 psi/90°/4 min. 40 sec | <10 | <10 | <10 | <10 |
|   | 4 |  | <10 | <10 | <10 | <10 |
| D | 1 | 100,000 psi*/90°/9 min. 19 sec | 10 | <10 | <10 | <10 |
|   | 2 | Ambient/90°/5 sec. | <10 | 10 | 10 | 10 |
|   | 3 | 100,000 psi/90°/4 min. 40 sec | <10 | <10 | <10 | <10 |
|   | 4 |  | <10 | <10 | <10 | <10 |
| E | 1 | 100,000 psi*/90°/1 min. | <10 | <10 | <10 | <10 |
|   | 2 | Ambient/90°/1 min. | <10 | <10 | <10 | <10 |
|   | 3 | 100,000 psi/90°/1 min. | <10 | <10 | <10 | <10 |
|   | 4 |  | <10 | <10 | <10 | <10 |
| F | 1 | 100,000 psi*/90°/1 min. | <10 | <10 | <10 | <10 |
|   | 2 | Ambient/90°/5 min. | 30 | <10 | <10 | <10 |
|   | 3 | 100,000 psi/90°/1 min. | <10 | <10 | <10 | 20 |
|   | 4 |  | <10 | <10 | <10 | <10 |
| Control-Untreated | 1 | — | 580,000 | 35,000 | <10 | 420,000 |
|   | 2 | — | 620,000 | 15,200 | 70 | 510,000 |
|   | 3 | — | 570,000 | 90 | 30 | 438,000 |
|   | 4 | — | 480,000 | 30 | 20 | 390,000 |

*1.5 $F_o$, **2.5 $F_o$

All samples evidenced good flavor and texture, with the macaroni noodles retaining discrete texture, and an absence of overcooked flavor. The pressure cycling sequences, with a pause between first and second cycles ranging from 5 seconds to 5 minutes, were all found acceptable. In particular it is noted that the sequence of lot E (1 minute pressurization, 1 minute pause, 1 minute pressurization) was effective at activating sterility. The total sequence time of three minutes provides a commercially viable, rapid method of sterilization with flavor and texture retention. It is believed, based on the combined results of lots D and E, that a sequence of 1 minute pressurization, 5 seconds pausing, 1 minute pressurization, would also activate sterility. These tests were run in a vessel jacketed with a heater that maintained the vessel wall at 202° F. With this series of tests was conducted at a preheat temperature of 90° C., it is believed that a preheat temperature of up to 100° C. would be still more efficient at achieving sterility without unduly affecting flavor and texture.

Current commercial high-pressure vessels can process food at a cost of $0.002 to $0.005 per pound, which is one-tenth the cost of conventional retorting. Overall, this high pressure sterilization process is the most efficient and the least costly for achieving a shelf stable food product. In addition, it is believed to be the only process which can achieve frozen food quality in a non-acidified, shelf stable food product.

It should be noted that the pressure vessel shell should preferably be insulated to minimize the heat loss after the vessel is pressurized and the adiabatic heat is added. In an un-insulated high pressure vessel shell, there is a significant heat loss from the adiabatic heated food and the cooler vessel shell.

While the preferred embodiment of the invention has been illustrated and described, it will be appreciated that various changes can be made therein without departing from the spirit and scope of the invention.

The embodiments of the invention in which an exclusive property or privilege is claimed are defined as follows:

1. A method for sterilizing a low acid food having a pH greater than or equal to 4.5 comprising:

(a) preheating the low acid food to an initial temperature of at least 70° C.;

(b) pressurizing the preheated low acid food to a first elevated pressure of at least 50,000 psi for a predetermined first period of time;

(c) then releasing the first elevated pressure for a predetermined pause period of time;

(d) then repressurizing the low acid food to a second elevated pressure of at least 50,000 psi for a predetermined second period of time; and (e) depressurizing and cooling the low acid food, wherein the initial temperature, first and second elevated pressures, and time periods are selected to produce a sterile food product that retains substantially uncooked flavor and texture.

2. The method of claim 1, wherein the first and second elevated pressures are each from 50,000 to 140,000 psi.

3. The method of claim 2, wherein the first and second elevated pressures are each from 60,000 to 120,000 psi.

4. The method of claim 3, wherein the first and second elevated pressures are substantially equal.

5. The method of claim 1, wherein the step of releasing the first elevated pressure for a predetermined pause period of time comprises releasing pressure to approximately ambient pressure.

6. The method of claim 1, wherein the pause period of time is greater than 0 to 5 minutes.

7. The method of claim 6, wherein the predetermined pause period of time is from 1 second to 5 minutes.

8. The method of claim 7, wherein the predetermined pause period of time is from 5 seconds to 1 minute.

9. The method of claim 1, wherein the initial temperature is from 70° C. to 100° C.

10. The method of claim 9, wherein the initial temperature is from 85° C. to 100° C.

11. The method of claim 10, wherein the initial temperature is from 90° C. to 100° C.

12. The method of claim 1, wherein the low acid food is maintained at least the initial temperature during the steps of pressurizing, releasing, and repressurizing.

13. The method of claim 12, wherein the low acid food is pressurized and repressurized within a pressure vessel, with heat being applied to the pressure vessel to maintain at least the initial temperature.

14. The method of claim 13, wherein heat is applied to the pressurization vessel to maintain the temperature at approximately equal to the sum of the initial temperature plus an adiabatic temperature increase experienced by the low acid food upon pressurization.

15. The method of claim 1, wherein each of the first and second predetermined periods of time are from greater than 0 to 200 minutes.

16. The method of claim 15, wherein each of the first and second predetermined periods of time are from 10 seconds to 10 minutes.

17. The method of claim 16, wherein each of the first and second predetermined periods of time are from 1 minute to 5 minutes.

18. The method of claim 1, wherein a total time for the steps of pressurizing, releasing and repressurizing is less than or equal to 5 minutes.

19. The method of claim 18, wherein a total time for the steps of pressurizing, releasing and repressurizing is less than or equal to 3 minutes.

20. A method for sterilizing a low acid food having a pH greater than or equal to 4.5, comprising maintaining the low acid food at a temperature of at least 70° C. during the steps of:

(a) pressurizing the low acid food to a first elevated pressure of at least 50,000 psi for a predetermined first period of time;

(b) releasing the first elevated pressure for a predetermined pause period of time; and (c) repressurizing the low acid food to a second elevated pressure of at least 50,000 psi for a predetermined second period of time, followed by depressurizing and cooling the low acid food, wherein the temperature, elevated pressures and time periods are selected to produce a sterile food product that retains substantially uncooked flavor and texture.

21. A method for sterilizing a food, comprising:

(a) preheating the food to an initial temperature of at least 70° C. to 100° C.;

(b) pressurizing the preheated food to a first elevated pressure of at least 50,000 psi to 140,000 psi for a predetermined first period of time;

(c) then depressurizing the food to approximately ambient pressure for a predetermined pause period of time;

(d) then repressurizing the food to a second elevated pressure of at least 50,000 psi to 140,000 psi for a predetermined second period of time; and (e) depressurizing and cooling the food, wherein the initial temperature, first and second elevated pressures, and time periods are selected to produce a sterile food product that retains substantially uncooked flavor and texture.

* * * * *